United States Patent [19]
Gustin et al.

[11] Patent Number: 5,867,673
[45] Date of Patent: Feb. 2, 1999

[54] UNIVERSAL OPERATOR STATION MODULE FOR A DISTRIBUTED PROCESS CONTROL SYSTEM

[75] Inventors: Jay W. Gustin, Scottsdale; Michael L. Hodge, Cave Creek; David L. Kirk, Phoenix, all of Ariz.

[73] Assignee: Honeywell Inc., Minneapolis, Minn.

[21] Appl. No.: 727,724

[22] Filed: Oct. 7, 1996

[51] Int. Cl.$^6$ ............................ G06F 13/00; G06F 13/14
[52] U.S. Cl. ................ 395/308; 395/200.8; 340/825.05; 370/270
[58] Field of Search .................................. 395/299, 301, 395/308, 309, 551, 200.8, 285, 293, 307, 306; 340/825.05, 825.52; 370/270; 711/171, 202

[56] References Cited

U.S. PATENT DOCUMENTS

| | | | |
|---|---|---|---|
| 4,556,974 | 12/1985 | Kozlik .................................... | 370/457 |
| 4,607,256 | 8/1986 | Henzel ................................ | 340/825.52 |
| 4,890,222 | 12/1989 | Kirk ........................................ | 395/551 |
| 5,006,976 | 4/1991 | Jundt . | |
| 5,255,375 | 10/1993 | Crook et al. .............................. | 395/285 |
| 5,455,916 | 10/1995 | Bourke et al. ........................... | 395/285 |
| 5,517,650 | 5/1996 | Bland et al. ........................ | 395/750.05 |
| 5,519,883 | 5/1996 | White et al. .............................. | 395/309 |
| 5,530,844 | 6/1996 | Phillips et al. . | |
| 5,546,546 | 8/1996 | Bell et al. . | |
| 5,561,820 | 10/1996 | Bland et al. . | |
| 5,659,696 | 8/1997 | Amini et al. ............................. | 711/202 |
| 5,710,892 | 1/1998 | Goodnow et al. ....................... | 395/307 |

FOREIGN PATENT DOCUMENTS

| | | |
|---|---|---|
| 0575 150 A2 | 12/1993 | European Pat. Off. . |
| 0730 234 A2 | 9/1996 | European Pat. Off. . |

OTHER PUBLICATIONS

Vetter, G.K., et al; "Process Control Architectures Using Workstation/X Windows TEchnology"; Jan. 1, 1991; Advances In Instrumentation And Control; vol. 46, NR.

"Arbitration for a Power PC CPU BUS/PCI System"; May 1, 1995, IBM Technical Disclosure Bulletin; vol. 38, NR–5, pp. 411–412.

"PCI to take Over the World? Not If, But When"; Nov. 1, 1994; Computer Design; vol. 33, NR–12, pp. 41–42, 44, 46–49.

Primary Examiner—Meng-Ai T. An
Assistant Examiner—Rupal D. Dharia
Attorney, Agent, or Firm—Arthur A. Sapelli; Anthony Miologos

[57] ABSTRACT

A module of a distributed process control system has a prior art kernel submodule, a peripheral submodule, and an interface circuit to provide for communications between the two submodules. The kernel submodule communicates with the interface circuit over a module BUS which includes a data BUS and an address BUS. The peripheral submodule communicates with the interface circuit over a peripheral component interface (PCI) BUS, a single thirty two bit BUS which is incompatible with the module BUS. The interface circuit permits such communications between the two submodules without requiring any hardware or software changes to the kernel submodule and the module BUS, nor to components of the peripheral submodule or its PCI BUS. The interface circuit includes interface registers, a control circuit which determines which submodule is permitted to write or read data and/or address into or from a given register of the interface registers. Input circuits controlled by control signals produced by the control circuit determines the source of the data and/or addresses written into a given register. An output circuit under the control of the control circuit determines the BUS over which the contents of a given register are transmitted to the addressed submodule.

15 Claims, 4 Drawing Sheets

UNIVERSAL OPERATOR STATION MODULE FOR A DISTRIBUTED PROCESS CONTROL SYSTEM

CROSS-REFERENCE TO RELATED APPLICATION

U.S. Patent Application of Jay W. Gustin, et al, entitled "Control Circuit", filed concurrently herewith, which application is assigned to the assignee of the present invention and which is incorporated herein by reference and made a part hereof as if fully set forth herein.

BACKGROUND OF THE INVENTION

(1) Field of the Invention

This invention is in the field of distributed process control systems and more particularly relates to improvements to the universal operator station module of such systems by replacing certain specially designed hardware and software components of the peripheral submodule of the universal operator station module with commercially available hardware and software.

(2) Description of Related Art

Distributed process control systems, such as Honeywell Inc.'s TDC3000, provides a computerized plant management system, a version of which is described and claimed in U.S. Pat. No. 4,607,256, which issued Aug. 19, 1986. Each such process control system includes a universal operator station module which provides the means by which the operator responsible for the overall operation of the process or processes being supervised obtains the information needed to perform this function as well as the capability of transmitting information, including commands or instructions, to control subsystems of the plant management system to control the processes being supervised. All communications between a universal operator module and other modules of the network are via the network's local control network (LCN) BUS which provides the universal operator station module with access to the data highways of any digital process control and data acquisition subsystems of the system of the plant management system.

All of the hardware and software components of the submodules of the prior art operator station module were speciall designed to perform the functions required of an operator station module such as producing a video display on a CRT, I/O functions for keyboards, printers, etc., mass storage devices, and a general purpose data processing capability for optimizing the system, for example. There has been a tremendous increase in the performance of commercially available personal computers (PCs), their associated peripheral devices, and related operating system software, and with a concomitant reduction in their cost in recent years. Thus, it would be desirable to incorporate commercially available PCs, peripherals, and software into the peripheral submodule of a universal operator station module in place of the specialized hardware and software components of the peripheral submodule of an operator station module. The problem with doing so is that the commercially available hardware and software communicate using industry standard commercially available BUS protocols, an example of one of which is the peripheral component interface (PCI) BUS and signaling protocol. Unfortunately the PCI BUS and signaling protocol is incompatible with the BUS and signaling protocol of the module BUS. This invention provides a solution to this problem.

SUMMARY OF TBE INVENTION

The present invention provides an improved interface circuit that permits communication via the interface circuit between the kernel submodule and the peripheral submodule of the universal operator station (OS) module in which the components of the peripheral module are standard commercially available electronic components and such hardware's associated software. The improved interface circuit does so without requiring any changes to the hardware and/or software of the components of the kernel submodule, or to any of the other modules of the process control system. The kernel submodule communicates with its components and with the interface circuit over its module BUS, the structure and protocol of which is unchanged. The components of the peripheral submodule likewise communicate with one another over the peripheral component interface (PCI) BUS and with the interface circuit as well.

The interface circuit includes a module BUS data latch, a global data multiplexer, and a module BUS state machine in communication with the module BUS and the control lines associated with the module BUS. The interface circuit also includes a set of interface registers, local control network processor (LCNP) control registers, peripheral interface controller (PIC) and display generator (DG) control registers, small computer system interface (SCSI) control registers, work station interface (WSI) control registers, and peripheral computer interconnect (PCI) configuration space registers. The PCI BUS is connected to a PCI interface address and data latch which provides a communication path between the PCI BUS and a PCI state machine and a register data multiplexer through which communication between the PCI BUS and the interface registers takes place. An arbiter circuit connected to the module BUS state machine and the PCI state machine determines which BUS is the source of signals transmitted through the interface circuit. Addresses from the two busses are applied to an address multiplexer which determines which addresses are applied to which one of the interface control registers as well as to the LCNP control registers. It should be noted that addresses from the address multiplexer are not applied to the PCI configuration space registers of the set of interface register.

It is therefore an object ofthis invention to provide an improved universal operator station module for a distributed process control system which permits a specially designed peripheral submodule and its associated software to be replaced by commercially available hardware and software without requiring any changes to the hardware and software of the kernel submodule or any of the other modules of the system.

It is another object of this invention provide and improved interface circuit of a universal operator station of a distributed process control system which permits the kernel submodule to communicate with commercially available hardware and software to replace specially designed peripheral submodules without requiring any changes in, or to, the kernel submodule of the module nor any changes to the other module of the distributed process control system.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be affected without departing from the spirit and scope of the novel concepts of the disclosure, and in which.

DESCRIPTION OF THE PREFERRED EMBODIMENTS

Figure 1:
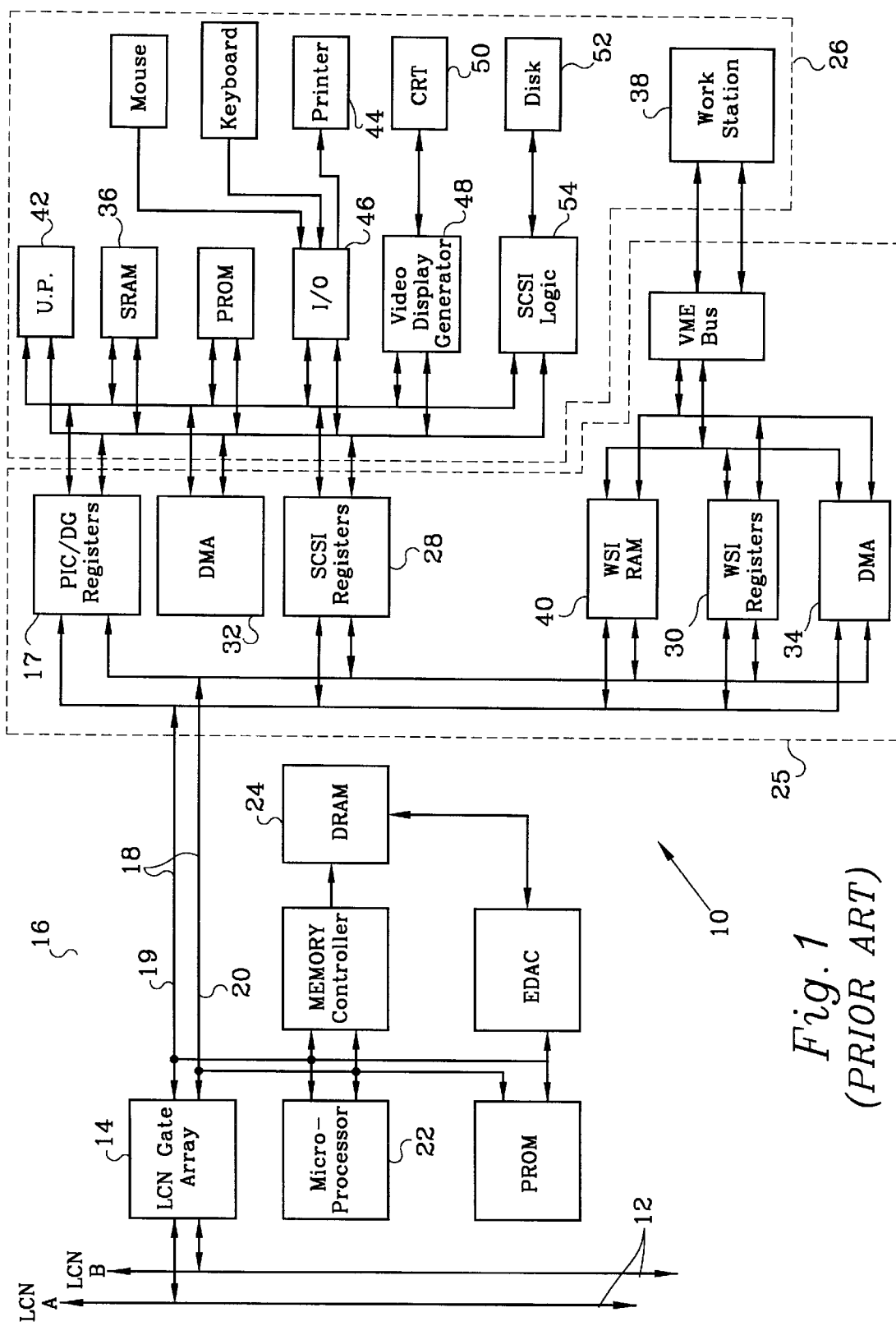
FIG. 1 is a block diagram of a prior art universal operator station module.

FIG. 1 is a block diagram of a prior art universal operator station 10 of a distributed process control system which includes a token-passing distributed plant control network. In this network a plurality of physical modules of varying capabilities and functionalities communicate with one another over local control network (LCN) BUS 12 such as is described and claimed in U.S. Pat. No. 4,607,256 which issued on Aug. 19, 1986. LCN BUS 12 is a high-speed, bit serial, dually redundant BUS, which BUS is comprised of two coaxial cables, LCN A and LCN B, and over which Manchester encoded signals are transmitted bit serially. Each of the modules of the network is the equal, or peer, of the other, and each of the modules includes a LCN gate array 14 of kernel submodule 16, the function of LCN gate array 14 is to receive data transmitted to module 10 over LCN BUS 12, for example, and to convert the bit serial data received into the format required for module BUS 18 which includes a thirty two bit data BUS 19 over which data, operands and instructions, are transmitted. Module BUS 18 also includes a twenty four bit address BUS 20 over which addresses are transmitted. LCN gate array 14 also has the function of receiving data and addresses from module BUS 18, converting the information received so that it can be transmitted to an identified module over LCN BUS 12 when module 10 is authorized to do so by having the token in the token passing network.

Kernel submodule 16 also includes a microprocessor 22 and dynamic random access memory (DRAM) 24. Data and addresses received over LCN BUS 12 by LCN gate array 14 are written into memory 24. Microprocessor 22 operating under an appropriate application program determines which one of the control registers of interface circuit 25 data is to be written which data controls the functionality, or operation, of the peripheral submodule 26 of module 10. The control registers of interface circuit 25 include (PICIDG) registers 27, where "PIC" is the acronym for "peripheral interface controller" and "DG" is the acronym for "display generator"; small computer systems interface (SCSI) registers 28; and work station interface (WSI) registers 30. The function of each of the direct memory access (DMA) circuits 32, 34 of interface circuit 25 are to move large blocks of data from kernel memory 24 to memory 36 and from memory 24 to the memory of work station 38. WSI RAM 40 provides a mailbox for data in blocks too large to be written into WSI registers 30. It should be noted that the components of kernel submodule 16 communicate with each other over module BUS 18.

When microprocessor 22 has written data into one or the other of control registers 27 or 28, microprocessor 22 sends an interrupt over control lines that are not illustrated to microprocessor 42. Microprocessor 42 in response reads the data and addresses written into register 27. If the data in register 27 is a command which results in printer 44 printing an alpha-numeric character, microcomputer 42 causes the necessary data and commands to be transmitted through I/O controller 46 to printer 44. If the data is a command for video display generator 48 to cause CRT 50 to display certain information, the necessary data are written into register 27, and microprocessor 42 when is reads the data out of register 27 will cause display generator 48 to obtain the necessary data to create the desired image or images on CRT 50. Because the amount of data needed to create a CRT display is much greater than that which can be written into the eight sixteen bit registers of PIC/DG registers 27, the necessary data is moved from memory 24 to memory 36 via DMA 32 under the control of microprocessor 42. When video display generator 48 is ordered to create a display, microprocessor 42 interprets drawing commands from RAM 36 and transfers video display information to video display generator 48.

With respect to writing data onto disk 52, the necessary instructions are written into SCSI registers 28, the data to be written is moved by DMA circuit 32 from memory 24 to memory 36, and microprocessor 42 will cause SCSI logic circuit 54 to write the data onto disk 52.

When kernel 16 is to send data, operands and instructions, to work station 38, the necessary instructions and addresses are written into WSI registers 30 and possibly WSI RAM 40. A synchronization signal applied to work station 38 through WSI RAM 40 will cause work station 38 to fetch the data in register 30 and possibly in WSI RAM 40. If a large block data is to be transmitted to work station 38, DMA circuit 34 will cause the data to be moved from memory 34 to the memory of work station 38.

When a block of data from disk 52, for example, is to be transmitted to another module of the system, microprocessor 22 causes the necessary instructions to control the operation of microprocessor 42 to be written into registers 28. The block of data is transferred from disk 52 to memory 36. DMA 32 then causes the data to be read from memory 36 and to be written into memory 24. An interrupt signal notifies micro processor 22 when the transfer is complete. Microprocessor 22 will then provide the necessary data including instruction to LCN gate array 14 so that LCN gate array 14 can transmit the data to the addressed module over LCN BUS 12 when module 10 has the token, and is thus authorized to transmit a message containing the desired data to the addressed module.

Keyboard data is transmitted one alphanumeric character at a time. When the operator strikes a key, sixteen bits of binary data representing the alphanumeric character corresponding to that key is written into control register 27 under the control of micro-processor 42. After the necessary data is written into register 27 by microprocessor 42, microprocessor 42 sends an interrupt to microprocessor 22 to inform microprocessor 22 that data for kernel submodule 16 is present in control register 27

Figure 2:
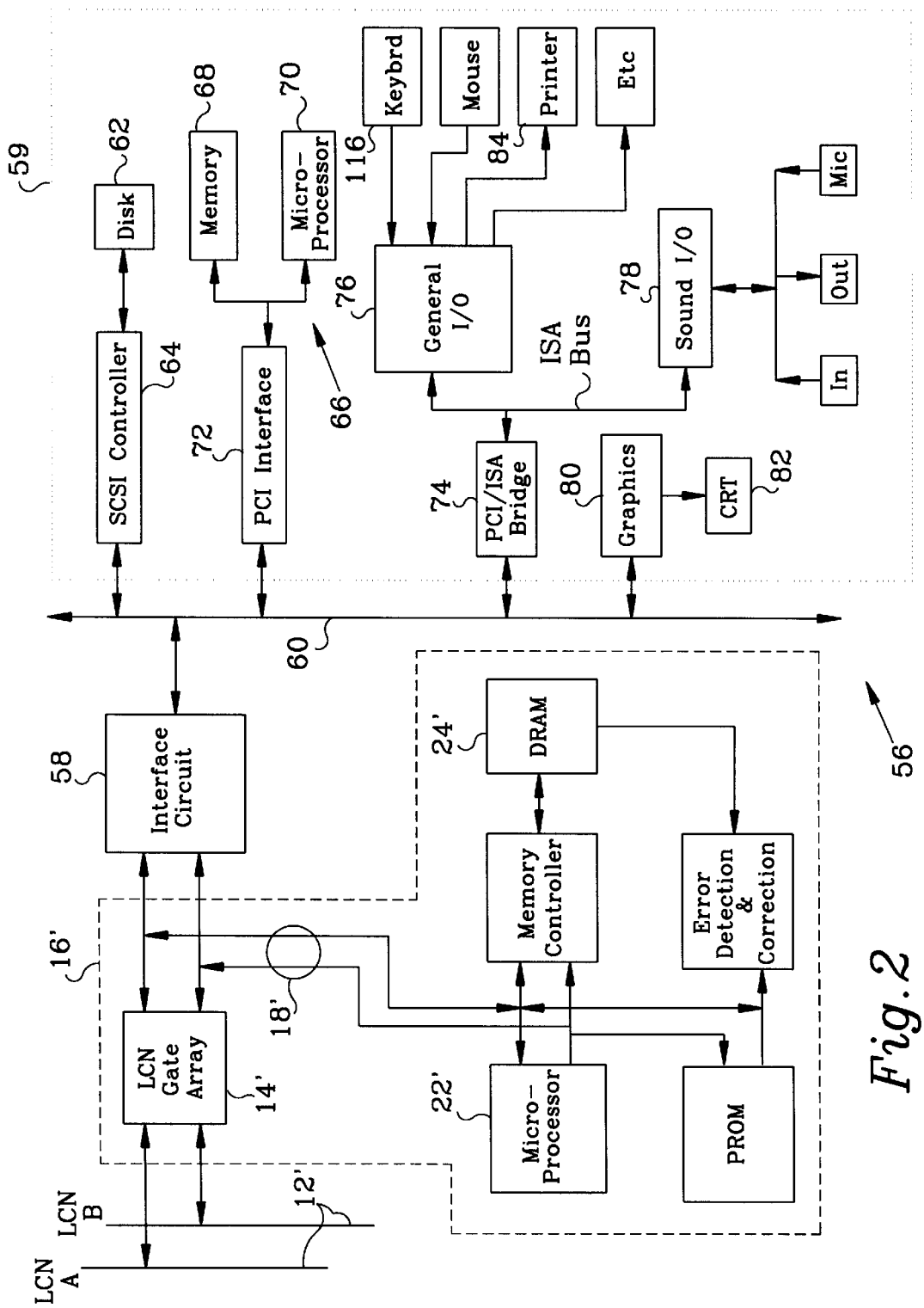
FIG. 2 is a block diagram of the universal operator station module incorporating the interface circuit of this invention.

Referring to FIG. 2, kernel submodule 16' of module 56 is substantially identical to kernel submodule 16 of prior art module 10 and has the same functions as kernel submodule 16. Module 56 includes interface circuit 58 by means of which kernel submodule 16' communicates with the components of peripheral submodule 59 of module 56. The connection between interface circuit 58 and kernel submodule 16' is by means of module BUS 18', and the connection between interface circuit 58 and the components of peripheral submodule 59 is by means of peripheral component interconnect (PCI) local BUS 60. It should be noted that PCI buses are used in many commercially available products. PCI BUS 60 is a 32 bit BUS on which addresses and data, commands and byte lane controls, are multiplexed.

Disk 62 is connected through SCSI controller 64 to PCI BUS 60. Personal computer (PC) 66, which includes memory 68 and microprocessor 70 is connected through PCI interface circuit 72 to BUS 60. PCI/ISA bridge circuit 74 connects a conventional, or general, I/O controller 76 and its associated peripherals to PCI BUS 60, and circuit 74 also connects sound I/O controller 78 and its associated peripherals to BUS 60. Likewise, graphics controller 80 connects CRT 82 to PCI BUS 60. All of the components of peripheral submodule 59 of universal operator station module 56 are commercially available hardware and software components satisfying appropriate industry standards. Peripheral submodule 59 performs basically the same functions as peripheral submodule 26 of module 10. However, peripheral submodule 59 can provide additional functionality because of the increased capabilities of PC 66 compared to the capabilities of microprocessor 42, for example. As a result PC 66 can and does perform the functions of work station 38 of prior art peripheral submodule 26 illustrated in FIG. 1 as well as those of microprocessor 42 of module 10 of FIG. 1.

Figure 3A:
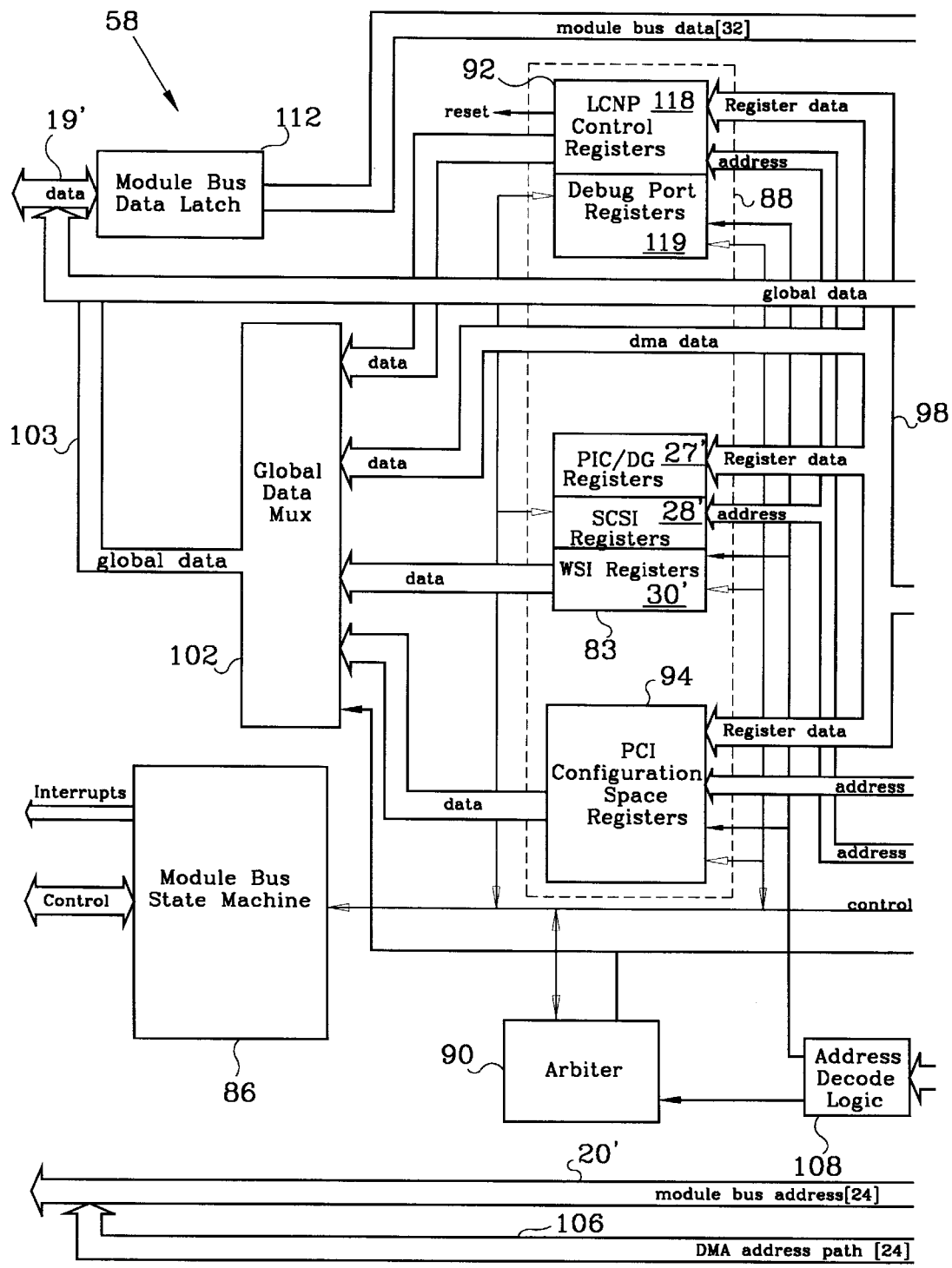
FIG. 3 is a block diagram of the interface circuit.
Figure 3B:
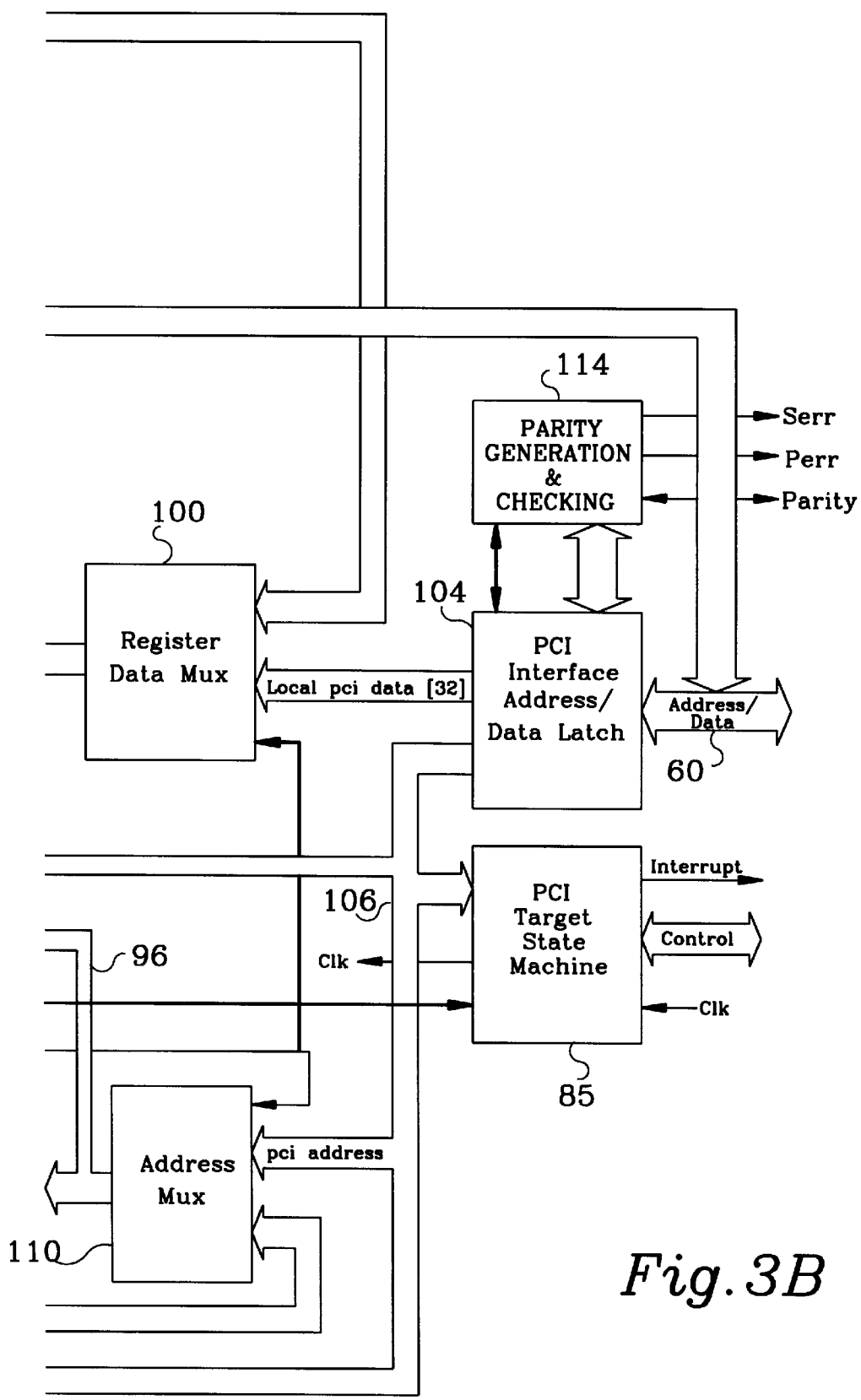

FIG. 3 is a block diagram of interface circuit 58 of module 56 illustrated in FIG. 2. Communication between kernel submodule 16' and interface circuit 58 is by means of module BUS 18' which includes thirty two bit data BUS 19', twenty four bit address BUS 20', and interrupt and control lines. The module BUS 18' of kernel submodule 16' and its BUS protocol are substantially identical to module BUS 18 and its BUS protocol of prior art module 10. Communication between interface circuit 58 and the components of peripheral submodule 59 of module 56 is by means of PCI BUS 60 and appropriate interrupt and control lines.

The function of interface circuit 58 is to convert signals from PCI BUS 60 which has its own signaling protocol to signals satisfying the signal protocol of module BUS 18', and to convert signals from module BUS 18' to signals satisfying the signal protocol of PCI BUS 60. The addresses on the module address BUS 20' define ranges of address of data; i.e., operands, instructions, or commands. One of these ranges contains addresses selecting a control register, such as control register 27', 28' or 30' that have the same function as control registers 27, 28, or 30 of interface circuit 25. Control registers 27', 28', and 30' are included in control register block 83. Each of the control registers 27', 28' and 30' is used by kernel submodule 16' to control the operation of components of peripheral submodule 59 such as a printer 84, disk 62, CRT 82, etc. in the same manner as submodule 16 controls components of peripheral submodule 26 prior art module 10, such as printer 44, disk 52, or CRT 50. Data written into control registers 27', 28' and 30' by peripheral submodule 59 are processed by kernel submodule 16' in exactly the same manner as data written into control registers 27, 28, and 30 of interface circuit 25 of module 10.

The PCI protocol, more accurately signals on PCI BUS 60, are interpreted by PCI state machine 85, and the module BUS protocol, more accurately, control signals from kernel submodule 16' are interpreted by module BUS state machine (MBSM) 86. Signals such as FRAME#, IRDY#, C/BE[3 . . . 0]# inform the target such as SCSI controller 64 to which the signals are addressed when and what type of data are being transmitted over BUS 60. It is the function of PCI state machine 85 to detect such signals to determine what control signals need to be sent to which one of the control registers 27', 28', or 30' of register block 83, and to produce the PCI control signals required by the PCI BUS protocol. PCI state machine 85 advances to different states in synchronism with the PCI clock signal applied to it. PCI state machine 85 may dwell in a certain state waiting for either a PCI BUS signal, or signals, or for control signals from module BUS state machine 86.

Arbiter circuit 90 determines which BUS, PCI BUS 60 or module BUS 18', has access to one of the interface registers 88. Registers 88 include local control network processor (LCNP) and debug port (DP) registers 92, and control registers 27', 28' and 30' of register block 83. Arbiter 90 also determines PCI access to address BUS 96 and data BUS 98. It should be noted that module BUS 20' does not have access to register 94 nor to PCI BUS 60. Access by PCI BUS 60 to register 94 is also controlled by arbiter 90.

Module BUS state machine (MBSM) 86 produces module BUS control signals which allows kernel submodule 16' to read, or write into a register of registers 92 or of register block 83. MBSM 86 produces module BUS control signals which permit a direct memory access operation to be executed to or from DRAM 24' of kernel submodule 16'. MBSM 86 controls the timing of all accesses to any one of the registers of interface registers 88 by kernel submodule 16'. Module BUS state machine 86 also controls the timing of DMA cycles access to DRAM 24' over module BUS 20'. As a result, separate DMA circuits which are included in interface circuit 25 of prior art module 10 are not needed in interface circuit 58. MBSM 86 advances to different states in synchronism with the PCI clock signals applied to it, and it will change to the next state or dwell in a given state depending on control signals from module BUS 16', PCI state machine 85, and arbiter 90. MBSM machine 86 also controls PCI interrupt generation. For additional information on the functions of arbiter state machine 90, PCI target state machine 85, module BUS state machine 86, and address decode logic circuit reference is made to the above identified cross-reference patent application, the disclosure of which is incorporated herein by reference.

All internal BUS functions of interface circuit 58 are handled by multiplexers. All of the data outputs of registers 92, 83, and 94, collectively referred to as interface registers 88, as well as the PCI and module BUS data, are selected by global data multiplexer 102 with its output being applied to global data BUS 103. Global data BUS 103 feeds the output side of PCI BUS 60 and the output side of module data BUS 19'. Arbiter circuit 90 selects which one of the four possible inputs to global data multiplexer is the output of global data multiplexer 102 applied to global data BUS 103.

Register data multiplexer 100 controls the flow of data from PCI BUS 60, or from module BUS 18', to registers 92, 27',28', 30' and 94. Which of the two inputs to register data multiplexer 100 that is applied to data BUS 98 is determined by control signals from arbiter 90.

PCI BUS 60 is a multiplexed BUS over which both addresses and data are transmitted. PCI interface address/data latch 104 is a two stage latch, with the first stage shared by both addresses and data. Because PCI BUS 60 is multiplexed, a two stage address latch is required to meet the setup and hold timing specifications during the address phase and subsequently to capture the address in the second stage on the next clock signal. If the access is a PCI write, the data is continually latched by the first stage on each rising clock edge following the address phase through the end of the cycle. If the access is a PCI read, the first stage of the address/data latch is not utilized after the address phase.

There are two possible sources of the addresses of interface registers 88. One is PCI BUS 60, and the other is module address BUS 20'. Arbiter circuit 90 decides which one is to be the source and sends a signal to address multiplexer 110 to this effect. Address multiplexer is a 24 stage 2 to 1 multiplexer. The control signal from arbiter 90 selects the lower order 24 bits from the 32 bit from the PCI address, or the 24 bit address from module address BUS 20'.

During a PCI read of DRAM 24' data from module data BUS 19' is only valid until the data acknowledge signal (DTACK) signal is received. To release module data BUS 19' when the DTACK signal is received, module data latch 112 captures the valid data received from module data BUS 19' and holds it until the PCI BUS data phase is terminated.

PCI BUS 60 is a flexible BUS that needs to be configured on startup. This is accomplished by writes to and reads of the registers of PCI configuration space registers 94 of the components of peripheral submodule 59. The definition and use, as well as the signaling necessary to program these registers are set forth in PCI Specification, Revision. 2.0.

There are several functions performed by LCNP control registers 92. One is to reset microprocessor 22' of kernel submodule 16'. This is accomplished by writing to a specific register in LCNP control registers 92 from PCI BUS 60. LCNP control registers 92 also provide a debug port. Registers to read and write to the debug port are contained in registers 92. Another function of LCNP control registers 92 is to provide an interrupt vector register. Data in this register contains information concerning which register of interface registers 88 has data written into it by microprocessor 22' of kernel submodule 16'; and information indicating a reset of kernel submodule 16'.

PCI addresses are transmitted by PCI interface address/data latch 104 and by PCI address BUS 106 to either read or write data from or into dynamic RAM 24', from or into one of the interface registers 26',28', 30', 92, and 94. Address decode logic circuit 108 decodes the PCI addresses applied to it by address multiplexer 110 to determine if PCI BUS 60 is accessing registers 26', 28', 30', 92 or DRAM 24'. Similarly, address decode logic circuit 108 decodes module BUS addresses applied to it by address multiplexer 110 to determine which of registers 92, 27', 28' or 30' module BUS 18' is accessing. PCI configuration space register 94 includes an address decode circuit which internally decodes PCI addresses applied to registers 94 from PCI latch 104 over PCI address BUS 106.

Module BUS 18' includes 24 bit address BUS 20', and PCI BUS 60 is a 32 bit BUS with addresses and data being multiplexed on the same BUS. Address translation between PCI BUS 60 and components of interface circuit 58 and DRAM 24' are direct with respect to the lower order 24 bits of address. The upper eight bits of an address on PCI BUS 60 contain a base address which is the base address of the registers of interface registers 88 of interface circuit 58, DRAM 24', and status and control registers of kernel module 16'. This address is selected by PC 66 at configuration time in accordance with PCI Specification, Revision 2.0. for setting the base address and is then communicated to interface circuit 58. When an upper eight bits of a PCI address transmitted over BUS 106 compares with a configured base address, interface circuit 58 will respond appropriately.

Among the greater than sixteen million possible addresses, interface circuit 58 will allow access to interface registers 88 if the addresses fall into four ranges. The first range of addresses is in the range of from $E000–$EFF (hexadecimal) for the debug port register of LDCNP registers 92. Addresses in the range of from $43000–$45FFF (hexadecimal) are for control registers 27', 28' and 30'. A third range of addresses from $50000–$50003 (hexadecimal) are for interrupt vector registers of LCNP registers 92. The fourth range is from $80000–$FFFFFF (hexadecimal) and are addresses in DRAM 24' of kernel submodule 16'.

PCI state machine 85 includes circuits to check PCI addresses applied to it; and if an address is in one of the four above identified ranges of PCI configuration space registers 94, a request for access to module BUS 20' is signaled to arbiter 90. Module BUS 20' is controlled by arbiter 90 to prevent kernel submodule 16' from having access to interface registers 88 of interface circuit 58 to either to read data from or to write data into registers 88 when PCI BUS 60 has access to control registers 88, DRAM 24', or status registers of kernel submodule 16'. Module BUS state machine 86 controls the timing of accesses by kernel submodule 16' to interface registers 88 and when the write or read cycle is completed, MBSM 86 returns control of module BUS 20' to processor 22' of kernel submodule 16'. When such a cycle is completed, MBSM 86 notifies PCI state machine 85 that the cycle is over which in turns transmits a cycle complete signal over PCI BUS 60 to the components of personality submodule 59 of module 56.

When data is to be read from disk 62, which is initiated by kernel submodule 16', microprocessor 22' creates a data structure in DRAM 24' that includes a SCSI command for controller 64; a destination buffer, memory locations in DRAM 24' for the data read from disk 62; the disk targeted, in this case disk 62; and space for transaction status and checksum. Module BUS state machine 86 will generate the appropriate control signals which are applied to arbiter 90 requesting access to SCSI register 28'. When arbiter circuit 90 grants module BUS 18' such access, microprocessor 22' writes a START command into the command register of SCSI register 28'. Writing the START command into register 28' causes a bit to be set in the interrupt vector register of LCNP register 92 and a PCI interrupt is issued. The bit set in the interrupt vector register indicates the cause of the interrupt was a write of a command to the SCSI register from kernel submodule 16'. Microprocessor 70 responds to the interrupt by reading the interrupt vector register in register 92 which results in microprocessor 70 reading the command register in registers 28'. The start command causes microprocessor 70 to read the data structure from DRAM 24'. Microprocessor 70 uses the data in the data structure to initiate a read access to disk 62. The data read from disk 62 is transmitted through PCI interface address/latch 104, register data multiplexer 100, data BUS 98, and DMA data BUS 114 to global data multiplexer 103 and through multiplexer 102 to data BUS 19' of module BUS 18' for storage in the designated buffer area in DRAM 24'. Upon completion of the transfer of the data, microprocessor 70 rebuilds the data structure in DRAM 24' with the addition of status information about the disk read transaction. Micro processor 70 then writes to the interrupt vector register in register 28' which causes an interrupt to be issued to microprocessor 22'. Microprocessor 22' responds with an interrupt acknowledge cycle, after reading the interrupt vector register of register 28'. The data in the data structure indicates if the transaction was completed with or without error.

As an example of a transaction initiated by peripheral submodule 59, an application program running on microprocessor detects a keystroke on keyboard 116, for example. Appropriate data and addresses are generated and are transmitted over BUS 60 to PCI interface/address Data Latch 104 and PCI State machine 85 which interprets the data and address signal as a request to write keystroke data into the keyboard input register of PIC/DG register 27'. PCI state machine 85 generates a request for access to register 27' which is transmitted to arbiter 90. When arbiter 90 grants PCI BUS 60 access, the PCI address is transmitted through address multiplexer 110 to address decode logic 108 which decodes the address as being to the keyboard input register of registers 27' and enables the data transmitted through register data multiplexer 100 to be applied to data BUS 98 and to be written into the keyboard input register of registers 27'. Microprocessor 70 similarly writes status information into the operational status register of register 27' prior to generating an interrupt to microprocessor 22'. Microprocessor 70 then writes an interrupt into the interrupt vector register of registers 27' which causes an interrupt to be transmitted to microprocessor 22' The data in the interrupt vector register of register 27' provides information to microprocessor 22' identifying the cause of the interrupt; namely, a keystroke. Microprocessor 22' then generates an interrupt acknowledge cycle resulting in a read of the interrupt vector register of PIC/DG register 27', and next reads the keyboard input register of registers 27' to obtain the desired keystroke data. Microprocessor 22' will then read the operational status register of register 27' to obtain additional information. Doing so has the affect of clearing the current interrupt, and allowing microprocessor 70 to be able transmit another interrupt to registers 27' if required.

In the preferred embodiment, PC 66 is a Motorola Power PC-NT work station, and its operating system is a Microsoft Windows NT. The various peripherals of peripheral submodule 59 are commercially available and suitable for use with the Motorola Power PC-NT personal computer. While the description of this invention has been directed to a universal operator station module of a distributed process control system, it has application in other types of modules of such a system.

From the foregoing it should be evident that various modifications can be made to the described embodiment without departing from the scope of the present invention.

We claim:

1. A module of a distributed process control system, comprising:
   A) a kernel submodule having a plurality of components, a peripheral submodule having a plurality of components, and an interface circuit;
   B) at least one of the components of said kernel submodule being a microprocessor, said kernel submodule communicating with other modules of the process control system over a local control network BUS and for communicating with components of said kernel submodule and with said interface circuit over a module BUS, said module BUS including an address BUS and a separate data BUS operating in accordance with a module BUS protocol;
   C) at least one of the components of the peripheral submodule being a personal computer (PC), said components of the peripheral submodule communicating with each other over a second BUS on which data and addresses are multiplexed and operating in accordance with a second BUS protocol, said second BUS and said second BUS protocol being incompatible with the module BUS protocol of the kernel submodule; and
   D) said interface circuit including a plurality of interface registers, control circuit means for determining which submodule is permitted to write or read data and/or addresses into or from a given register of said interface registers, said interface circuit means including a module BUS state machine means, a second BUS state machine means, and arbiter circuit means, the module BUS state machine means receiving control signals from the kernel submodule, the second BUS state machine means receiving control signals from the peripheral submodule, both state machines producing control signals which are communicated to each other and to the arbiter circuit means, the arbiter circuit means in response to the control signals produced by the module BUS state machine means and the second BUS state machine means for producing control signals for determining which BUS has access to the interface registers of the interface circuit at any given time period, input circuit means controlled by said control circuit means for determining the source of the data and/or addresses written into a given register of said interface registers under the control of said control circuit means, including a register data multiplexer to which data from the module BUS and the second BUS are applied and an address multiplexer to which addresses from the module BUS and the second BUS are applied and output circuit means to which the contents of any register of said interface register into which data has been read is transmitted to either the module BUS or the second BUS under the control of the control circuit means.

2. A module of a distributed process control system as defined in claim 1, in which the module BUS address bus is twenty four bits wide and the data bus is thirty two bits wide.

3. A module of a distributed process control system as defined in claim 2, in which the second BUS is a single thirty two bit wide BUS and on which addresses and data are multiplexed.

4. A module of a distributed process control system as defined in claim 3 in which the output circuit means includes a global data multiplexer to which data to be transmitted to the kernel submodule are applied.

5. A module of a distributed process control system as defined in claim 4 in which the second BUS is a peripheral component interface (PCI) BUS.

6. An operator station (OS) module for a distributed process control system, comprising
   A) a kernel submodule having a plurality of components, a peripheral submodule having a plurality of components, and an interface circuit;
   B) at least one of the components of said kernel submodule being a microprocessor, said kernel submodule communicating with other modules of the process control system over a local control network BUS and for communicating with components of said kernel submodule and with said interface circuit by a module BUS, said module BUS including a data BUS and an address BUS and operating in accordance with a module BUS protocol;
   C) at least one of the components of the peripheral submodule being a personal computer (PC), said components of the peripheral submodule communicating with each other over a second BUS on which data and addresses are multiplexed and operating in accordance with a second BUS protocol which is incompatible with the module BUS and protocol of the kernel submodule; and
   D) said interface circuit including a plurality of interface registers, control circuit means for determining which submodule is permitted to write or read data and/or addresses into or from a given register of said interface registers, a data multiplexer and an address multiplexer controlled by said circuit means for determining the source of the data and/or address written into a given register of said interface registers under the control of said control circuit means, and an output multiplexer to which the contents of any register of said interface register into which data has been read is transmitted to either the data BUS of the module BUS or the second BUS under the control of the control circuit means.

7. An operator station module of a distributed process control system as defined in claim 6 in which the control circuit means of the interface circuit includes a module BUS state machine means, a second BUS state machine means, and arbiter circuit means, the module BUS state machine receiving control signals from the kernel submodule, the second BUS state machine receiving control signals from the peripheral submodule, both state machines producing control signals which are communicated to each other and to the arbiter circuit means, the arbiter circuit means in response to the control signals produced by the module BUS state machine means and the second BUS state machine for producing control signals for determining which BUS has access to the interface registers of the interface circuit at any given time period.

8. An operator station module of a distributed process control system as defined in claim 7, in which the module BUS includes a twenty four bit address BUS and a separate thirty two bit data BUS.

9. An operator station module of a distributed process control system as defined in claim 8 in which the second BUS is a single thirty two bit BUS and on which addresses and data are multiplexed.

10. An operator station module of a distributed process control system as defined in claim 9 in which the second BUS is a peripheral component interface (PCI) BUS.

11. In an operator station (OS) module of a distributed process control system having a plurality of modules which communicate with one another over a local control network BUS, with each module of the system including a kernel submodule and a peripheral submodule with the kernel submodule and peripheral submodules communicating with each other by means of the module's interface circuit, the kernel submodule of the OS module having a plurality of components, at least one of the components of said OS kernel submodule being a microprocessor, said OS module kernel submodule communicating with said interface circuit by a module BUS, said module BUS including a data BUS and an address BUS and operating in accordance with a module BUS protocol; the improvements comprising;

the OS module's peripheral submodule including a plurality of components, at least one of the components of the peripheral submodule being a personal computer (PC), said components of the peripheral submodule communicating with each other and with the OS modules interface circuit over a BUS on which data and addresses are multiplexed and which BUS operates in accordance with a second BUS protocol which is incompatible with the module BUS protocol of the kernel submodule;

said OS module's interface circuit including a plurality of interface registers, control circuit means to control signals from the kernel submodule and the peripheral submodule of the OS module for determining which submodule of the OS module is permitted to write or read data and/or addresses into or from a given register of said interface registers, a data multiplexer and an address multiplexer controlled by said circuit means for determining the source, either the kernel module, or the peripheral module, of the data and/or address written into a given register or registers of said interface registers under the control of said control circuit means, and an output multiplexer to which the contents of any register of said interface circuit means, and an output multiplexer to which the contents of any register of said interface register into which data has been read transmitted to either the data BUS of the module BUS or the second BUS under the control of the control circuit means.

12. In an OS module of a distributed process control system as defined in claim 11 in which the control circuit means of the interface circuit includes a module BUS state machine means, a second BUS state machine means, and arbiter circuit means, the module BUS state machine receiving control signals from the kernel submodule, the second BUS state machine receiving control signals from the peripheral submodule, both state machines producing control signals which are communicated to each other and to the arbiter circuit means, the arbiter circuit means in response to the control signals produced by the module BUS state machine means and the second BUS state machine for producing control signals for determining which BUS has access to the interface registers of the interface circuit at any given time period.

13. In an OS module of a distributed process control system as defined in claim 12 in which the module BUS includes a twenty four bit address BUS and a separate thirty two bit data BUS.

14. In an OS module of a distributed process control system as defined in claim 13 in which the second BUS is a single thirty two bit BUS.

15. In an OS module of a distributed process control system as defined in claim 14 in which the second BUS is a peripheral component interface (PCI) BUS.

* * * * *